US012116241B2

(12) United States Patent
Kanteti

(10) Patent No.: US 12,116,241 B2
(45) Date of Patent: Oct. 15, 2024

(54) METHODS OF DECREASING THE ELEVATOR WAIT TIME BY INTEGRATING WITH CALENDAR SERVER

(71) Applicant: Otis Elevator Company, Farmington, CT (US)

(72) Inventor: Neeraja Kanteti, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1371 days.

(21) Appl. No.: 16/683,615

(22) Filed: Nov. 14, 2019

(65) Prior Publication Data

US 2020/0165100 A1 May 28, 2020

(30) Foreign Application Priority Data

Nov. 22, 2018 (IN) ............................ 201811044054

(51) Int. Cl.
*B66B 1/46* (2006.01)
*B66B 1/34* (2006.01)

(52) U.S. Cl.
CPC ............ *B66B 1/468* (2013.01); *B66B 1/3461* (2013.01); *B66B 2201/103* (2013.01); *B66B 2201/235* (2013.01); *B66B 2201/4653* (2013.01)

(58) Field of Classification Search
CPC . B66B 1/468; B66B 1/3461; B66B 2201/103; B66B 2201/235; B66B 2201/4653; B66B 1/2408; B66B 3/00; B66B 2201/232; B66B 2201/4615;
(Continued)

(56) References Cited

U.S. PATENT DOCUMENTS

| | | | |
|---|---|---|---|
| 1,003,567 | A | 9/1911 | Woods |
| 6,241,050 | B1 | 6/2001 | Hikita et al. |
| 7,849,974 | B2 | 12/2010 | Stanley et al. |

(Continued)

FOREIGN PATENT DOCUMENTS

| | | | |
|---|---|---|---|
| CN | 104495538 | A | 4/2015 |
| CN | 105398893 | A | 3/2016 |

(Continued)

OTHER PUBLICATIONS

Anonymous; "Smarter Method of Managing Elevator Availability"; from IP.com Prior Art Database Technical Disclosure; http://ip.com/IPCOM/000229270; 4 pages; (2013).

(Continued)

*Primary Examiner* — Jeffrey Donels
(74) *Attorney, Agent, or Firm* — CANTOR COLBURN LLP

(57) ABSTRACT

An elevator system including an elevator controller configured for: effecting a first communication with a mobile device to receive data from an electronic calendar that is activated on the mobile device, rendering a plurality of determinations from the first communication, including: a first determination that a first entry in the electronic calendar indicates that a passenger associated with the mobile device has a first scheduled event that occurs at a first scheduled time, a second determination to effect elevator service proximate to the first scheduled time to the passenger, and effecting a second communication with the elevator car to thereby effect the second determination.

18 Claims, 5 Drawing Sheets

(58) Field of Classification Search
CPC ........... B66B 1/18; B66B 1/3415; B66B 3/02; B66B 2201/211
See application file for complete search history.

(56) References Cited

U.S. PATENT DOCUMENTS

| | | | |
|---|---|---|---|
| 8,839,913 | B2 | 9/2014 | Atalla et al. |
| 9,284,158 | B2 | 3/2016 | Sarjanen |
| 9,896,305 | B2 | 2/2018 | Blandin et al. |
| 10,315,884 | B2 * | 6/2019 | Simcik .................. B32B 27/308 |
| 2015/0368067 | A1 | 12/2015 | Tang |
| 2016/0122157 | A1 | 5/2016 | Keser |
| 2016/0304312 | A1 | 10/2016 | Thompson |
| 2016/0325962 | A1 * | 11/2016 | Blandin ................ B66B 1/3461 |
| 2016/0355375 | A1 | 12/2016 | Simcik et al. |
| 2017/0088397 | A1 * | 3/2017 | Buckman ........... G06Q 10/1095 |
| 2017/0137255 | A1 | 5/2017 | Simcik et al. |
| 2017/0291795 | A1 | 10/2017 | Scoville et al. |
| 2018/0111788 | A1 | 4/2018 | Kim |
| 2018/0118510 | A1 | 5/2018 | Simcik et al. |
| 2020/0002124 | A1 * | 1/2020 | Wirola .................... B66B 1/468 |
| 2020/0130994 | A1 * | 4/2020 | Tatikola ................ B66B 1/2408 |

FOREIGN PATENT DOCUMENTS

| | | | | |
|---|---|---|---|---|
| CN | 108737636 | A | 1/2021 | |
| EP | 3581533 | A1 * | 12/2019 | ............... B66B 1/28 |
| JP | 2003192244 | A | 7/2003 | |
| WO | WO-2013130032 | A1 * | 9/2013 | ........... B66B 1/2408 |
| WO | 2017058715 | A1 | 4/2017 | |

OTHER PUBLICATIONS

Extended European Search Report; Application No. 19210910.6; Apr. 30, 2020; 63 pages.

CN OA Issued Sep. 28, 2021, Received Nov. 3, 2021 in 10 Pages.

* cited by examiner

METHODS OF DECREASING THE ELEVATOR WAIT TIME BY INTEGRATING WITH CALENDAR SERVER

CROSS-REFERENCE TO RELATED APPLICATIONS

This application claims the benefit of Indian Application No. 201811044054 filed Nov. 22, 2018, the disclosure of which is incorporated herein by reference in its entirety.

BACKGROUND

The embodiments herein relate to elevator call servicing and more specifically to a system and method for assigning elevator service based on scheduled meetings for a passenger.

In building systems with a large population, usage of an elevator car may enable a passenger to timely arrive at scheduled meetings. Waiting time at an elevator lobby, however, may challenge an ability to timely arrive at scheduled meetings.

SUMMARY

Disclosed is an elevator system including an elevator controller configured for providing elevator service including: effecting a first communication with a mobile device to receive data from an electronic calendar that is activated on the mobile device, rendering a plurality of determinations from the first communication, including: a first determination that a first entry in the electronic calendar indicates that a passenger in possession of the mobile device has a first scheduled event that occurs at a first scheduled time, a second determination to provide elevator service proximate to the first scheduled time to the passenger, and effecting a second communication with the elevator car to thereby effect the second determination.

In addition to one or more of the above disclosed features or as an alternate, the controller: renders a third determination to communicate with the mobile device to obtain a confirmation for whether elevator service is required at the first scheduled time, and effects a third communication with the mobile device to thereby effect the third determination.

In addition to one or more of the above disclosed features or as an alternate, upon failing to receive the elevator call from the mobile device within a second predetermined duration before the first scheduled time, the controller renders a fourth determination to release the elevator car from effecting the second determination, and wherein the second predetermined duration is less than the first predetermined duration.

In addition to one or more of the above disclosed features or as an alternate, the third communication includes the mobile device inserting a first reminder in the electronic calendar, wherein the first reminder is an elevator call reminder, and wherein the mobile device schedules the first reminder to occur at first predetermined duration before the first scheduled time.

In addition to one or more of the above disclosed features or as an alternate, upon the mobile device receiving a confirmation to call an elevator from the passenger, the mobile device communicates with the elevator controller, whereby the controller effects the third determination.

In addition to one or more of the above disclosed features or as an alternate, the mobile device receives from the passenger an identification of a pick-up floor and a destination floor, and communicates the pick-up floor and the destination floor to the elevator controller.

In addition to one or more of the above disclosed features or as an alternate, the mobile device provides the passenger with a personalized message indicating an elevator car is being provided pursuant to the confirmation form the passenger.

In addition to one or more of the above disclosed features or as an alternate, the controller repeatedly effects the first communication at a predetermined time frequency while paired with the mobile device, thereby identifying one or more scheduling updates recorded in the electronic calendar and, responsive thereto, inserting into the electronic calendar a respective one or more reminders for elevator calls.

In addition to one or more of the above disclosed features or as an alternate, following an initial pairing with the mobile device, the controller automatically pairs with the mobile device when the mobile device is proximate one of a plurality of beacons and thereafter effects at least the first communication.

In addition to one or more of the above disclosed features or as an alternate, the controller communicates with the mobile device over a PAN through one or more telecommunication beacons distributed in the building.

Further disclosed is an elevator system including an elevator controller and mobile app configured for providing elevator service: wherein the mobile app on a mobile device renders a first determination that a first entry in an electronic calendar app on the mobile device indicates that a passenger in possession of the mobile device has a first scheduled event or meeting that occurs at a first scheduled time.

In addition to one or more of the above disclosed features or as an alternate, the mobile app further communicates with the calendar app on the mobile device, and the mobile device thereby displays a calendar reminder before the scheduled event or meeting.

In addition to one or more of the above disclosed features or as an alternate, the calendar reminder includes a message with a request for the passenger to confirm whether the passenger intends on boarding an elevator at a pick-up floor in order to attend the scheduled event or meeting.

In addition to one or more of the above disclosed features or as an alternate, the calendar reminder includes options for the passenger to accept or deny the request.

In addition to one or more of the above disclosed features or as an alternate, upon the mobile device receiving the confirmation to the request, the mobile device communicates with the elevator controller to call an elevator car.

In addition to one or more of the above disclosed features or as an alternate, the mobile device receives from the passenger an identification of a pick-up floor and a destination floor for attending the scheduled event or meeting, and communicates the pick-up floor and the destination floor to the elevator controller.

In addition to one or more of the above disclosed features or as an alternate, the mobile device provides the passenger with a message indicating an elevator car is being provided pursuant to the confirmation form the passenger.

In addition to one or more of the above disclosed features or as an alternate, the mobile app repeatedly communicates at a predetermined time frequency with the elevator controller, thereby confirming whether a requested elevator car is arriving at pick-up floor, calculating a time the elevator car is arriving at the pick-up floor, and sending the passenger information indicating that the elevator car is arriving at the pick-up floor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
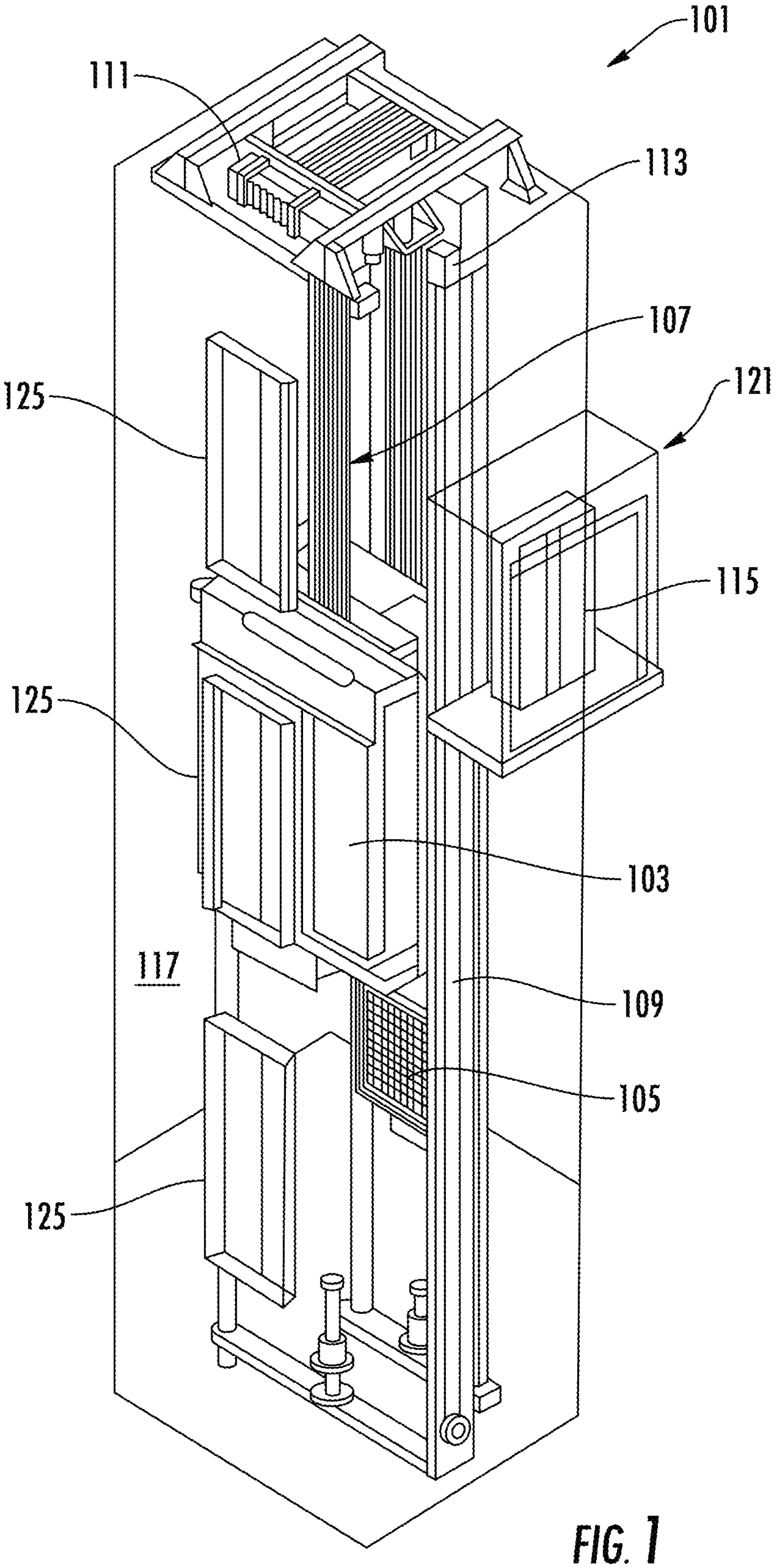
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

The following figures illustrate additional technical features associated with one or more disclosed embodiments. Features disclosed in the following figures having nomenclature similar to features disclosed in FIG. 1 may be similarly construed though being positively reintroduced with numerical identifiers that may differ from those in FIG. 1. Further, process steps disclosed hereinafter may be sequentially numbered to facilitate discussion of one or more disclosed embodiments. Such numbering is not intended to identify a specific sequence of performing such steps or a specific requirement to perform such steps unless expressly indicated.

Figure 2:
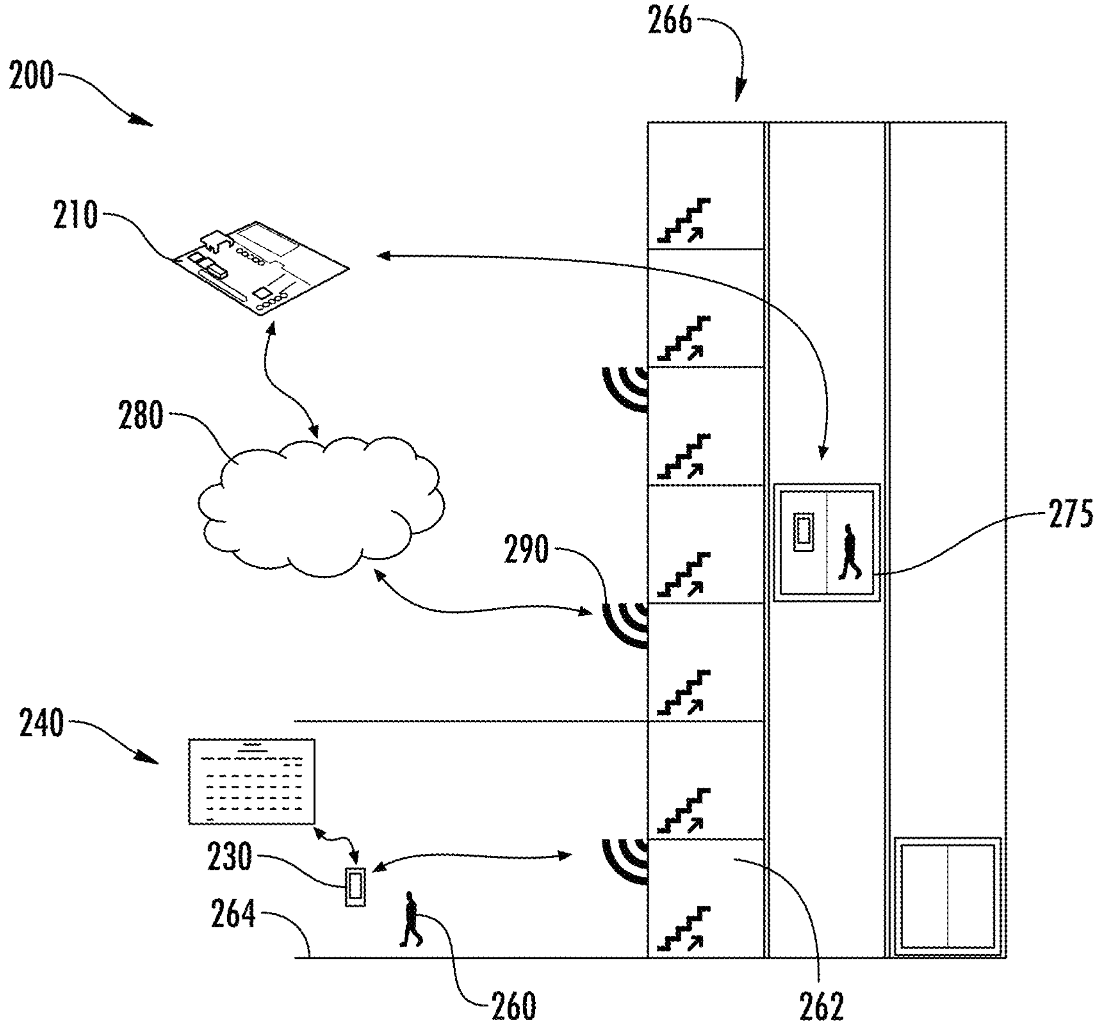
FIG. 2 illustrates additional features of the disclosed embodiments.
Figure 3:
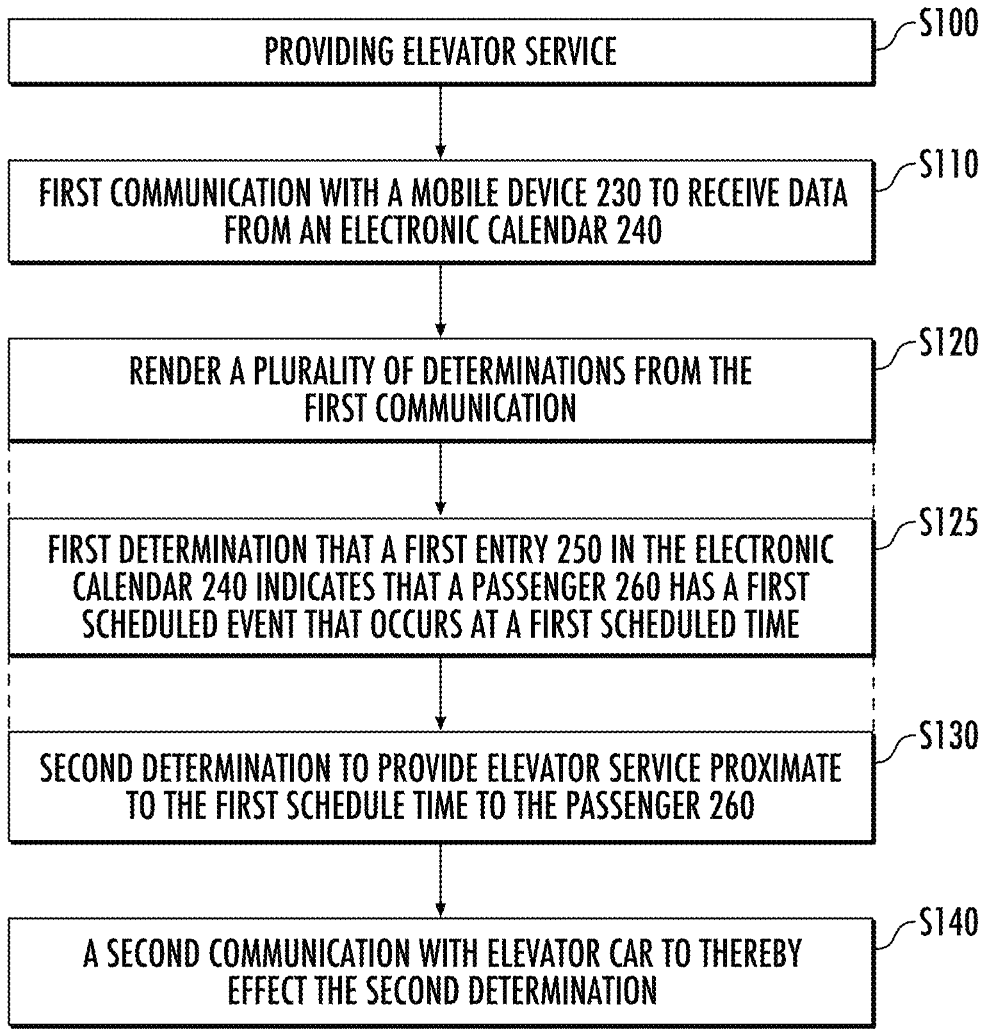
FIG. 3 illustrates a process performed by an elevator controller according to a disclosed embodiment.

Turning to FIGS. 2 and 3, disclosed is an elevator system 200 including an elevator controller 210. As illustrated in FIG. 3, the system 200 may be configured to perform a step S100 of providing elevator service. Step S100 may include the controller 210 performing step S110 of effecting a first communication with a mobile device 230 executing a mobile App whereby the controller 210 receives data from an electronic calendar 240 that is activated on the mobile device 230. At step S120 the controller 210 may render a plurality of determinations from the first communication including at step S125 a first determination that a first entry in the electronic calendar 240 indicates that a passenger 260 in possession of the mobile device 230 has a first scheduled event that occurs at a first scheduled time. At step S130 of the controller 210 renders a second determination to provide elevator service proximate to the first schedule time to the passenger 260. The second determination may include providing service at a first lobby 262 on a first floor 264 in a building 266. Step S120 may include step S140 of the controller 210 effecting a second communication with an elevator car 275 to thereby effect the second determination.

Figure 4:
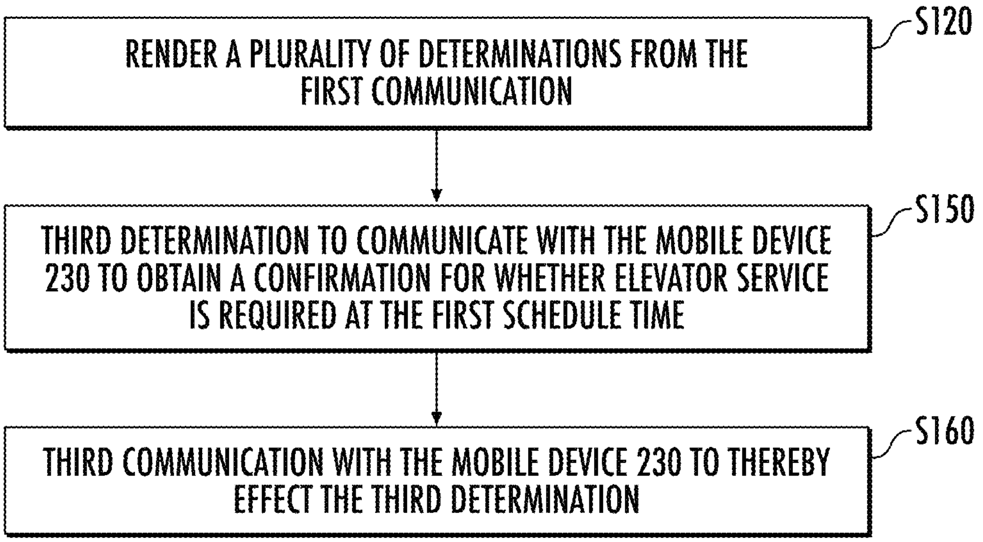
FIG. 4 illustrates a further process performed by an elevator controller according to a disclosed embodiment.

As further illustrated in FIG. 4, according to an embodiment step S120 may include step S150 of the controller 210 rendering a third determination to communicate with the mobile device 230 to obtain a confirmation for whether elevator service is required at the first schedule time. At step S160 the controller 210 may effect a third communication with the mobile device 230 to thereby effect the third determination.

Figure 5:
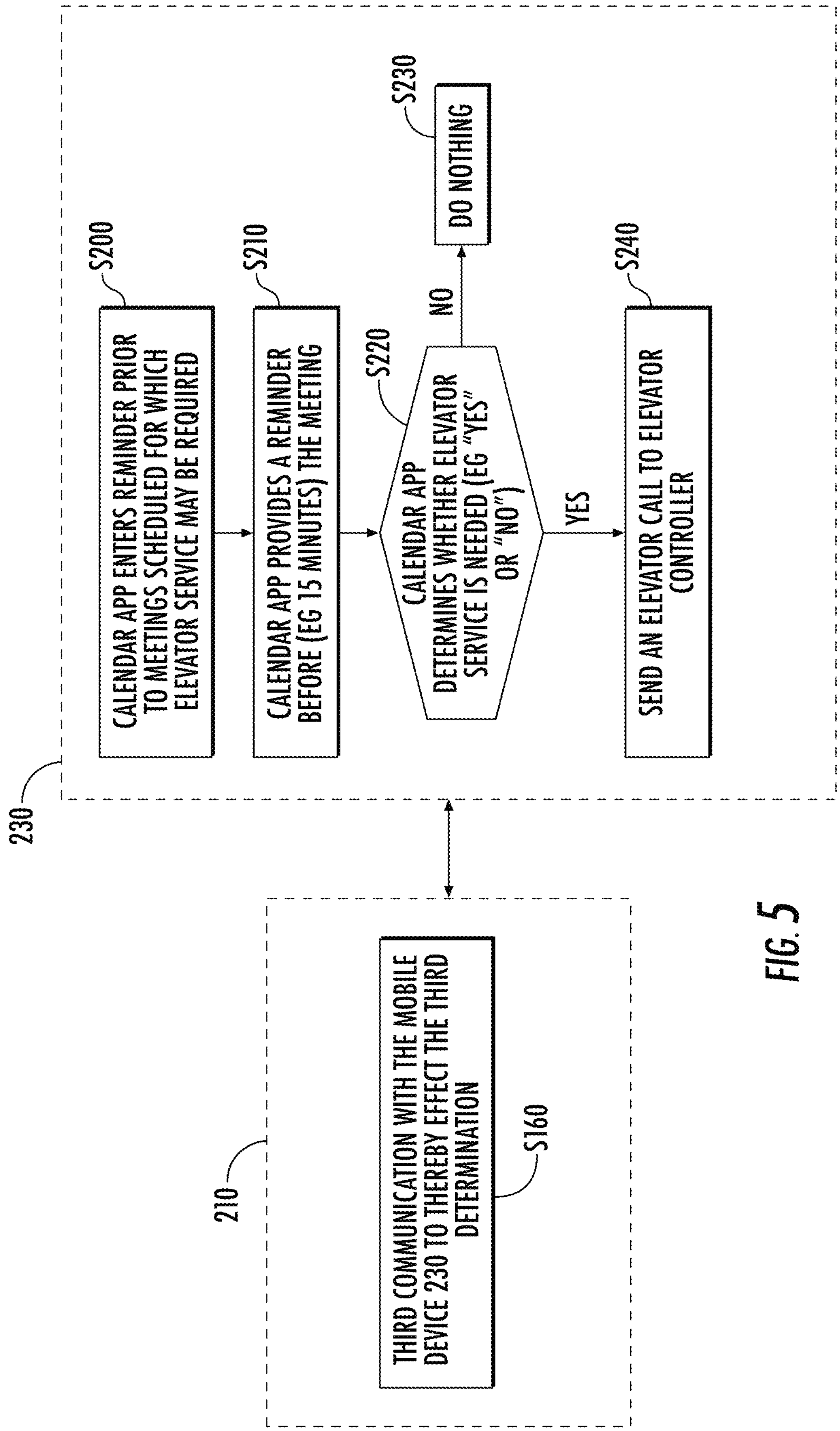
FIG. 5 illustrates a communication between an elevator controller and a mobile device executing a calendar App according to a disclosed embodiment.

Turning to FIG. 5, communications with the mobile device under step S160 include step S200 of the controller instructing the mobile device 280 to enter a calendar reminder via the mobile App to remind the passenger 260 about an upcoming meeting which may require elevator service. At step S210 the controller may instruct the mobile device to provide an alert reminder with the calendar app to the passenger 260 to determine whether the passenger will require elevator car service to attend the meeting. This reminder may be provided in a first period of time, for example, fifteen minutes prior to the meeting.

At step S220, a decision is made based on interaction with the passenger as to whether elevator car service is needed. For example, the passenger may be able to enter "yes" or "no" in order to obtain elevator car service. The passenger may also be able to identify pickup and destination floors for the elevator service. The mobile device may also be instructed by the controller to inform the passenger that an elevator is being called, for example, by indicating "the mobile device has contacted an elevator, and an elevator is arriving to floor 5, please come to lobby".

If the passenger indicates "no" then at step S230 the mobile device 230 takes no further action. Otherwise at step S240 the elevator controller receives form the mobile device a communication, for example effecting step S160. From this, the elevator controller renders the second determination S120 to provide elevator service to the passenger, as indicated above.

If the determination at step S220 was no, then upon failing to receive the elevator call from the mobile device 230 within a second predetermined duration before the first scheduled time, the controller 210 may render a fourth determination to release the elevator car 275 from effecting the second determination. According to an embodiment the second predetermined period of time may be less than the first predetermined period of time. For example, when a reminder to place an elevator call occurs fifteen minutes before a scheduled meeting, releasing the elevator car from effecting elevator service may occur five minutes before the scheduled meeting if no elevator call is received.

According to an embodiment the controller 210 may affect the first communication over a telecommunications network 280. The telecommunications network may be a personal area network (PAN). The controller 210 may communicate with the mobile device over a PAN through one or more telecommunication beacons 290 distributed in the building 266. In one embodiment the PAN is Bluetooth.

According to the above disclosed embodiments, each guest may have a mobile device with email server such as Microsoft Outlook. The disclosed embodiments provide for integrating the mail server application ("App") with an elevator mobile app. A reminder may prompt a guest/passenger minutes before a scheduled meeting to determine if the guest intends on utilizing an elevator and attend a meeting. If the guest accepts the meeting notice, for example by an affirmation (which may be though engaging a "Yes" textbox on a screen), then an electronic elevator call ("e-call") may be scheduled to an elevator car. Upon receiving the e-call, an elevator car may automatically arrive at the floor lobby to meet the guest. A guest may also schedule an elevator car to arrive at a desired floor at a specified time using a mobile calendar application. In such instance, a few minutes before the scheduled time to receive the elevator, a reminder may be provided to the mobile application for the guest. When the guest provides an affirmation, a command is sent to an elevator management application, which may be part of a building management system (BMS) to call the elevator car. The disclosed embodiments may reduce the waiting time for guests. The embodiments may also provide greater flexibility and ease of use for customers to obtain elevator service.

As used herein, mobile devices may be "smart devices" that may contain one or more processors capable of communication using with other such devices by applying wired and/or wireless telecommunication protocols. Non-limiting examples of a smart device include a mobile phone, personal data assistant (PDA), tablet, watch, wearable or other processor-based devices. Protocols applied by smart devices may include local area network (LAN) protocols and/or a private area network (PAN) protocols. LAN protocols may apply Li-Fi or Wi-Fi technology, which is a technology based on the Section 802.11 standards from the Institute of Electrical and Electronics Engineers, or IEEE. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols may also include Zigbee, a technology based on Section 802.15.4 protocols from the Institute of Electrical and Electronics Engineers (IEEE). More specifically, Zigbee represents a suite of high-level communication protocols used to create personal area networks with small, low-power digital radios for low-power low-bandwidth needs, and is best suited for small scale projects using wireless connections. Wireless protocols may further include short range communication (SRC) protocols, which may be utilized with radio-frequency identification (RFID) technology. RFID may be used for communicating with an integrated chip (IC) on an RFID smartcard. Wireless protocols may further include long range, low powered wide area network (LoRa and LPWAN) protocols that enable low data rate communications to be made over long distances by sensors and actuators for machine-to-machine (M2M) and Internet of Things (IoT) applications.

A building management system (BMS), reference above, may be otherwise known as a building automation system (BAS). The BMS is a computer-based control system installed in buildings that may have a need for controlling and monitoring mechanical and electrical equipment such as ventilation, lighting, power systems, fire systems, security systems, fire alarm systems and elevator systems. In addition to controlling an internal environment in a building, BMS systems may provide for access control (access doors) for implementing building security protocols, or to control other security systems such as closed-circuit television (CCTV) and motion detectors. A BMS may be responsible for controlling equipment that accounts for a majority of energy usage in a building.

In addition software applications in the form of an "App", referenced above, may be available from an App Store, which is a digital distribution platform for distributing computer software applications over the Internet. Apps contain program level protocols enabling structured and logical communications between devices.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system including an elevator controller configured for:
- effecting a first communication with a mobile device to receive data from an electronic calendar that is activated on the mobile device,
- rendering a plurality of determinations from the first communication, including:
  - a first determination that a first entry in the electronic calendar indicates that a passenger associated with the mobile device has a first scheduled event that occurs at a first scheduled time,
  - a second determination to effect elevator service proximate to the first scheduled time to the passenger, and
  - effecting a second communication with the elevator car to thereby effect the second determination;
- wherein the controller:
- renders a third determination to communicate with the mobile device to obtain a confirmation for whether elevator service is required at the first scheduled time, and
  - effects a third communication with the mobile device to thereby effect the third determination.

2. The system of claim 1 wherein upon failing to receive the elevator call from the mobile device within a second predetermined duration before the first scheduled time, the controller renders a fourth determination to release the elevator car from effecting the second determination, and wherein the second predetermined duration is less than the first predetermined duration.

3. The system of claim 2 wherein the controller instructs the mobile device to insert a first reminder in the electronic calendar, wherein the first reminder is an elevator call reminder, and schedule the first reminder to occur at first predetermined duration before the first scheduled time.

4. The system of claim 2 wherein the elevator controller receives from the mobile device a confirmation to call an elevator from the passenger, whereby the controller effects the third determination.

5. The system of claim 4 wherein the elevator controller receives from the mobile device an identification of a pick-up floor and a destination floor for the passenger.

6. The system of claim 5 wherein the controller instructs the mobile device to communicate to the passenger a personalized message indicating an elevator car is being directed to the pick-up floor pursuant to the confirmation form the passenger.

7. The system of claim 2 wherein the controller repeatedly effects the first communication at a predetermined time frequency while paired with the mobile device, thereby identifying one or more scheduling updates recorded in the electronic calendar and, responsive thereto, inserting into the electronic calendar a respective one or more reminders for elevator calls.

8. The system of claim 7 wherein following an initial pairing with the mobile device, the controller automatically pairs with the mobile device when the mobile device is proximate one of a plurality of beacons and thereafter effects at least the first communication.

9. The system of claim 8 wherein the controller communicates with the mobile device over a PAN through one or more telecommunication beacons distributed in the building.

10. A method of controlling an elevator system, the system including an elevator controller, the method comprising the elevator controller:
- effecting a first communication with a mobile device to receive data from an electronic calendar that is activated on the mobile device, rendering a plurality of determinations from the first communication, including:
  - a first determination that a first entry in the electronic calendar indicates that a passenger associated with the mobile device has a first scheduled event that occurs at a first scheduled time,
  - a second determination to effect service proximate to the first scheduled time to the passenger, and
  - effecting a second communication with the elevator car to thereby effect the second determination;
- wherein the controller:
- renders a third determination to communicate with the mobile device to obtain a confirmation for whether elevator service is required at the first scheduled time, and
- effects a third communication with the mobile device to thereby effect the third determination.

11. The method of claim 10 wherein upon failing to receive the elevator call from the mobile device within a second predetermined duration before the first scheduled time, the controller renders a fourth determination to release the elevator car from effecting the second determination, and wherein the second predetermined duration is less than the first predetermined duration.

12. The method of claim 11 wherein the controller instructs the mobile device to insert a first reminder in the electronic calendar, wherein the first reminder is an elevator call reminder, and schedule the first reminder to occur at first predetermined duration before the first scheduled time.

13. The method of claim 11 wherein the elevator controller receives from the mobile device a confirmation to call an elevator from the passenger, whereby the controller effects the third determination.

14. The method of claim 13 wherein the elevator controller receives from the mobile device an identification of a pick-up floor and a destination floor for the passenger.

15. The method of claim 14 wherein the controller instructs the mobile device to communicate to the passenger a personalized message indicating an elevator car is being directed to the pick-up floor pursuant to the confirmation form the passenger.

16. The method of claim 11 wherein the controller repeatedly effects the first communication at a predetermined time frequency while paired with the mobile device, thereby identifying one or more scheduling updates recorded in the electronic calendar and, responsive thereto, inserting into the electronic calendar a respective one or more reminders for elevator calls.

17. The method of claim 16 wherein following an initial pairing with the mobile device, the controller automatically pairs with the mobile device when the mobile device is proximate one of a plurality of beacons and thereafter effects at least the first communication.

18. The method of claim 17 wherein the controller communicates with the mobile device over a PAN through one or more telecommunication beacons distributed in the building.

* * * * *